United States Patent [19]

Sultzbaugh

[11] Patent Number: 5,256,034
[45] Date of Patent: Oct. 26, 1993

[54] VARIABLE PITCH PROPELLER FOR USE IN CONJUNCTION WITH A VERTICAL AXIS WIND TURBINE

[76] Inventor: John S. Sultzbaugh, 25 Romberger La., Elizabethville, Pa. 17023

[21] Appl. No.: 687,640

[22] Filed: Apr. 19, 1991

[51] Int. Cl.⁵ .............................................. F03D 3/02
[52] U.S. Cl. ................................. 416/91; 416/119; 415/914
[58] Field of Search ............... 416/90 R, 91, 117, 119, 416/231 R, 118; 415/2.1, 4.1, 4.2, 4.4, 914

[56] References Cited

U.S. PATENT DOCUMENTS

| | | |
|---|---|---|
| 685,774 | 11/1901 | Lieske ................................. 416/119 |
| 1,076,713 | 10/1913 | Southwick ......................... 416/119 |
| 1,794,930 | 3/1931 | Spencer .............................. 416/119 |
| 2,128,592 | 8/1938 | Mushkin ............................. 416/119 |
| 4,534,703 | 8/1985 | Flavell ................................ 416/119 |
| 4,565,929 | 1/1986 | Baskin . | 
| 4,678,923 | 7/1987 | Trepanier . |
| 4,832,571 | 5/1989 | Carrol . |

FOREIGN PATENT DOCUMENTS

| | | |
|---|---|---|
| 2908761 | 9/1980 | Fed. Rep. of Germany .... 416/90 R |
| 3505823 | 8/1986 | Fed. Rep. of Germany ........ 416/91 |
| 63806 | 7/1864 | France ................................ 416/119 |
| 524637 | 9/1921 | France ................................ 416/119 |
| 2186033 | 8/1987 | United Kingdom ................. 416/91 |

Primary Examiner—Edward K. Look
Assistant Examiner—James A. Larson
Attorney, Agent, or Firm—Terry M. Gernstein

[57] ABSTRACT

A variable pitch propeller mechanism includes a plurality of airfoil-shaped blades on three spaced apart blade arms. The airfoil-shaped blades are pivotally connected to the blade arms and are interconnected to each other by rigid connecting rods so these blades move in unison in response to changing wind conditions. Air flow across the airfoil-shaped blades is also controlled to improve the efficiency of the device.

2 Claims, 4 Drawing Sheets

VARIABLE PITCH PROPELLER FOR USE IN CONJUNCTION WITH A VERTICAL AXIS WIND TURBINE

TECHNICAL FIELD OF THE INVENTION

The present invention relates to the general art of power generation, and to the particular field of wind power generators.

BACKGROUND OF THE INVENTION

Wind energy has not been utilized extensively by industry in the United States because of economics. Wind energy seems to be most promising in the generation of electricity at specific sites where wind velocities are high and reasonably steady. However, these sites tend to be remote from most industrial locations. Noise generation, safety considerations and television interference also tend to discourage the use of wind devices in congested areas.

To date, wind conversion devices have been proposed and built in a very wide variety of types. The most common type is the horizontal-axis head-on type, typical of conventional farm windmills. The axis of rotation is parallel to the direction of the wind stream. Where the wind direction is variable, the device must be turned into the wind either by a tail vane or by a servo device or the like. The rotational speed of the device can be controlled by feathering the blades or by flap devices or by varying the load.

Another form of wind conversion device is the vertical-axis wind turbine (VAWT). Examples of such devices are the Savonius or Darrieus types. In such devices, wind direction is not important, which is a tremendous advantage. Furthermore, the system is simple, and no stresses are created by yawing or turning into the wind as occurs on horizontal-axis devices. A VAWT is lighter in weight, requires only a short tower base and can have the generator near the ground as compared to horizontal-axis devices.

While successful, even the VAWT system can be improved by improving the efficiency thereof. One area of inefficiency is the turbulence created adjacent to the blades as wind moves therepast. This turbulence may affect the operation of other blades and the overall system efficiency. The turbulence is often created because the blades of the device are not oriented properly to take maximum advantage of the wind, or because of the characteristics of the fluid flow associated with the blades.

Therefore, there is a need for a wind conversion device that takes maximum advantage of the flow of air past the device.

OBJECTS OF THE INVENTION

It is a main object of the present invention to provide a wind conversion device that takes maximum advantage of the flow of air past the device.

It is another object of the present invention to provide a wind conversion device that takes maximum advantage of the flow of air past the device by orienting the blades thereof in the most effective orientation.

It is another object of the present invention to provide a wind conversion device that takes maximum advantage of the flow of air past the device by controlling the fluid flow characteristics of air flowing past the blades of the device.

SUMMARY OF THE INVENTION

These, and other, objects are achieved by a vertical-axis wind conversion device that has three blade arms each comprising a plurality of airfoil-shaped blades pivotally mounted thereon. Connecting rods connect the airfoil-shaped blades together, and these blades are mounted on the blade arms to move in a venetian blind fashion. In this manner, the blades are orientable to take maximum advantage of the wind flowing past the device.

Still further, the device includes means for controlling the flow past each blade to reduce turbulence associated with such flow. Turbulence from one blade may affect the operation of adjacent blades and adjacent airfoils. Specifically, the means for controlling the air flow past the airfoils includes means for controlling the boundary layer of the air flowing past each airfoil. Most specifically, the means includes a pump for sucking air into the interior of each airfoil to maintain the boundary layer attached to the airfoil well past the location of maximum thickness thereof. This will reduce the size of the wake associated with each airfoil thereby reducing the overall turbulence associated with the blades. Reduction of turbulence will improve the overall efficiency of the device.

BRIEF DESCRIPTION OF THE DRAWING FIGURES

DETAILED DESCRIPTION OF THE PREFERRED EMBODIMENT OF THE INVENTION

Figure 1:
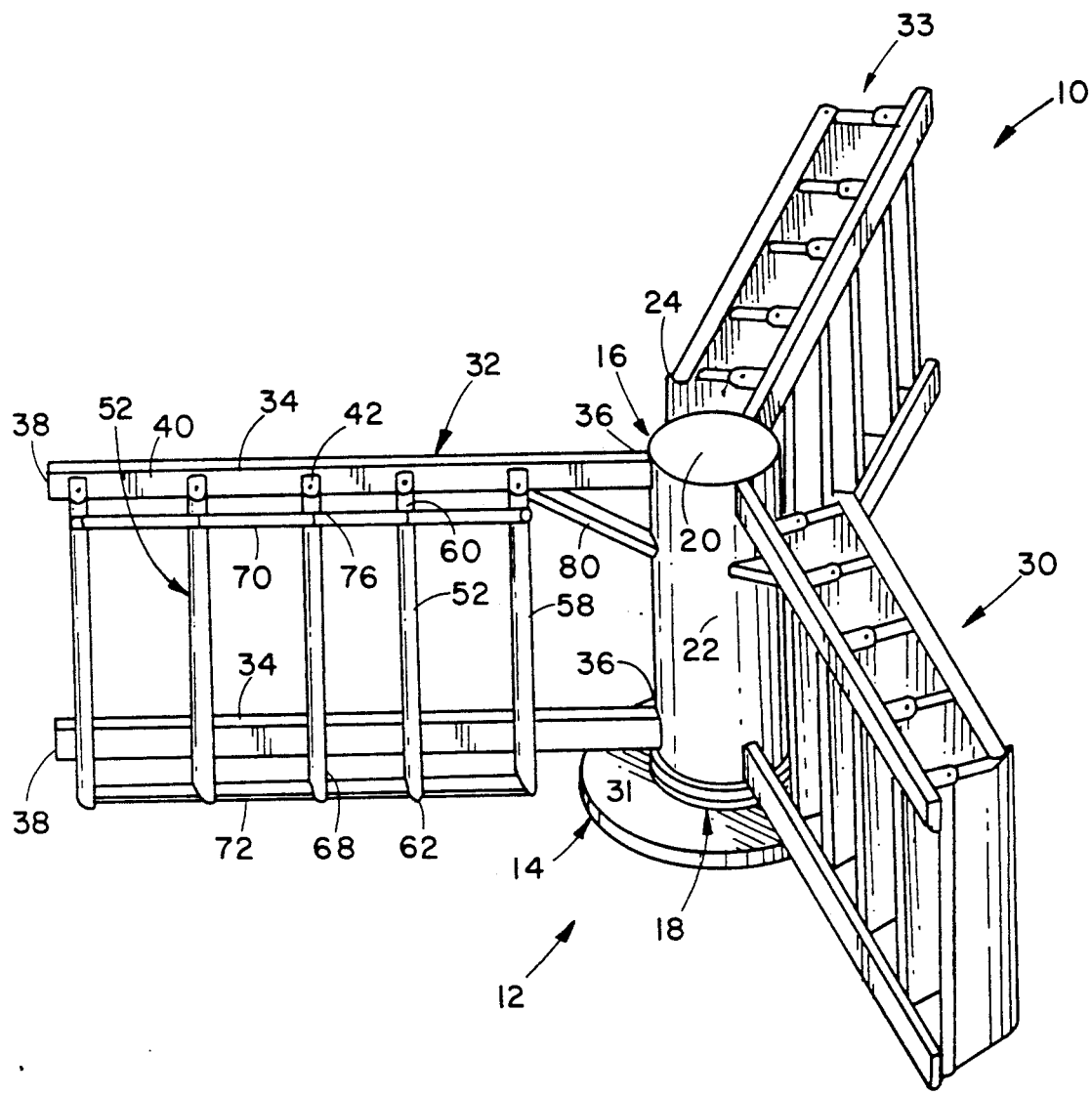
FIG. 1 is a perspective view of a variable pitch propeller mechanism embodying the present invention.

Shown in FIG. 1 is a variable pitch propeller mechanism 10 that can be used to operate one or more windmill systems. The mechanism 10 includes a central hub 12 that has a base 14 that will be mounted on top of a support post or the like to provide a vertical-axis wind turbine configuration. The central hub further includes a cylindrical housing 16 having a proximal end 18 fixed to the base 14, a closed end 20 and a cylindrical wall 22 connecting the proximal end to the closed end. The cylindrical wall 22 is hollow and has a longitudinal axis 24 extending between the closed and proximal ends of the housing. The longitudinal axis 24 is vertically oriented, and the housing rotates about that vertically oriented longitudinal axis under the influence of wind pressure generated by wind flowing past the device.

Figure 6:
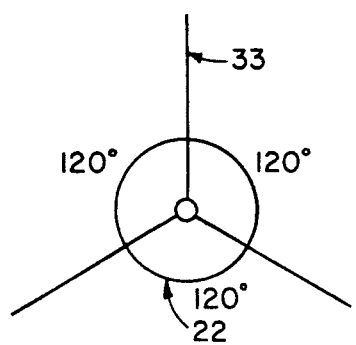
FIG. 6 is a top plan view illustrating the angular spacing between blade arms.

The device 10 further includes three blade arms 30, 32 and 33, each connected to the housing wall 22 and being equiangularly spaced apart from each other by angles of 120° as is indicated in FIGS. 1 and 6. All of the blade arms are identical, therefore, only blade arm 32 will be described.

Figure 2:
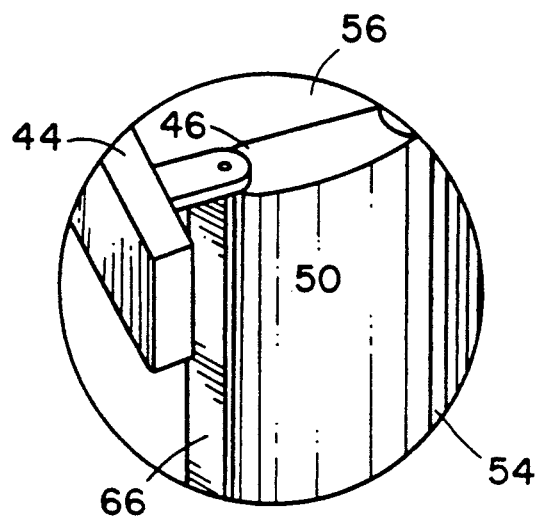
FIG. 2 is a detail of the connection between one airfoil-shaped blade and a strut of a blade arm.
Figure 3:
FIG. 3 is an elevational view taken through section 3—3 of FIG. 1.

The blade arm 32 includes two identical parallel support struts 34 each connected at a proximal end 36 thereof to the hub wall 22 and extending radially outward from that hub to a distal end 38. The two struts are spaced apart along the hub longitudinal axis 24 to have one strut located adjacent to the base 14 and one strut located adjacent to the closed end 20 of the hub housing. Each support strut has a longitudinal axis 40 extending between the distal and proximal ends thereof, and has a plurality of support brackets, such as support bracket 42, fixed thereto and spaced apart from each other along the support strut longitudinal axis 40. The supporting brackets are shown in FIGS. 1 and 2 and include a mounting end 44 fixed to the support strut and a free end 46 spaced from the support strut. A pivot pin 50 is attached to the bracket to extend toward the other support strut.

Figure 8:
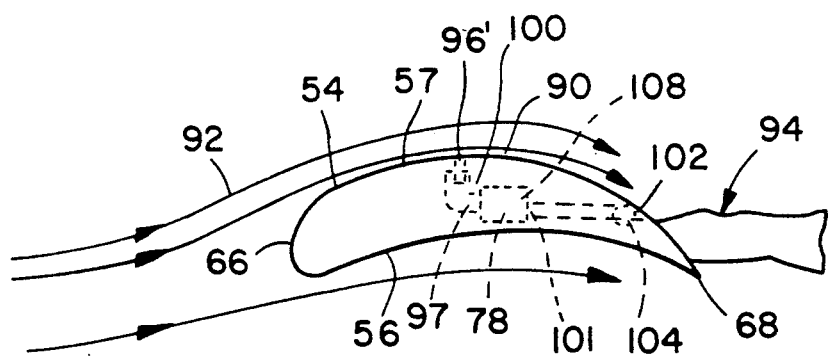
FIG. 8 illustrates an airfoil-shaped blade and the air flow therepast along with means for controlling the characteristics of such air flow.

As shown in FIGS. 1, 2, 4 and 5, an airfoil-shaped blade, such as airfoil-shaped blade 52, is attached to each support bracket by the pivot pins 50. All of the airfoil-shaped blades are identical and each includes a top surface 54 and a bottom surface 56. The surfaces 54 and 56 are curved about a longitudinal centerline 58 extending from one end 60 of the airfoil-shaped blade to the other end 62 thereof. Both surfaces 54 and 56 are curved in the same direction, but at different curvatures as is best shown in FIG. 8. In this manner, a pressure differential is developed across the thickness dimension of the blade, with the thickness dimension being measured between the top and bottom surfaces 54 and 56. Each blade has a location of maximum thickness, indicated in FIG. 8 at 57. The top and bottom surfaces intersect each other at a leading edge 66 located adjacent to the support struts, and at a trailing edge 68 spaced from the support struts. All of the top surfaces are located on the same side of the blade arms with respect to the central hub so the pressure differentials associated with each airfoil-shaped blade will co-operate with each other. It is noted that the distance between ends 36 and centerline 58 of a first blade is equal to or greater than the distance between struts 34 and centerline 58 whereby mechanical advantage is improved.

The airfoil-shaped blades are all connected to the brackets in a pivotal manner, and each blade arm further includes two rigid connecting rods 70 and 72 attached to each of the airfoil-shaped blades on each blade arm by pivot pins, such as pivot pin 76. The connecting rods cause all of the blades to move in unison in the manner of venetian blinds.

As shown in FIG. 1, each blade arm further includes a gusset strut 80 connected to one support strut and to the central hub.

As discussed above, the overall efficiency of the device can be improved by controlling the air flow over the airfoil-shaped blades.

A means of controlling air flow past the blades is illustrated in FIGS. 7-10. The means includes controlling the boundary layer formed as air flows past the airfoils. The boundary layer is indicated at 90 in FIG. 8 and is formed as air flows past the top surface of the airfoil as is indicated by streamlines 92. As the air flows past the airfoil, it builds up an adverse pressure gradient after passing the location of maximum thickness 57. This adverse pressure gradient eventually causes the air to separate from the airfoil and form a wake 94. This wake tends to disturb air flow past adjacent airfoil blades and can influence the operation of the device.

Figure 10:
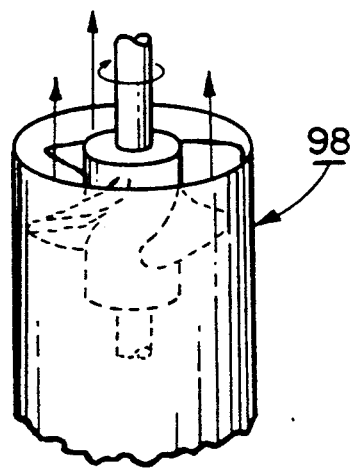
FIG. 10 illustrates one flow pump that can be used in controlling the air flow past an airfoil-shaped blade.
Figure 4:
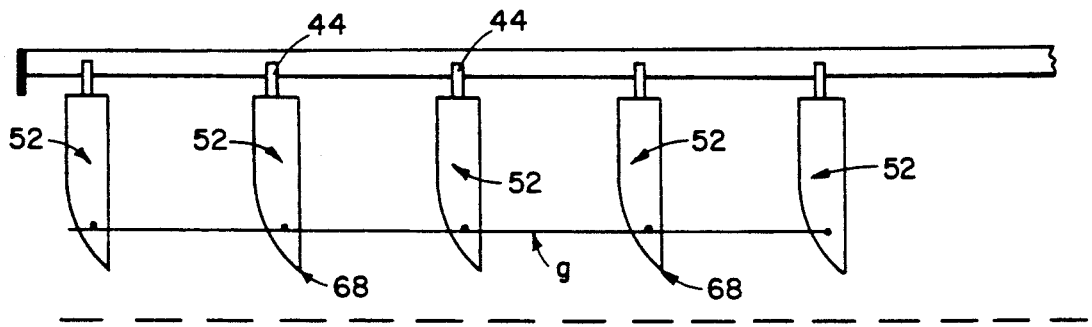
FIG. 4 is a top plan view of a blade arm.
Figure 5:
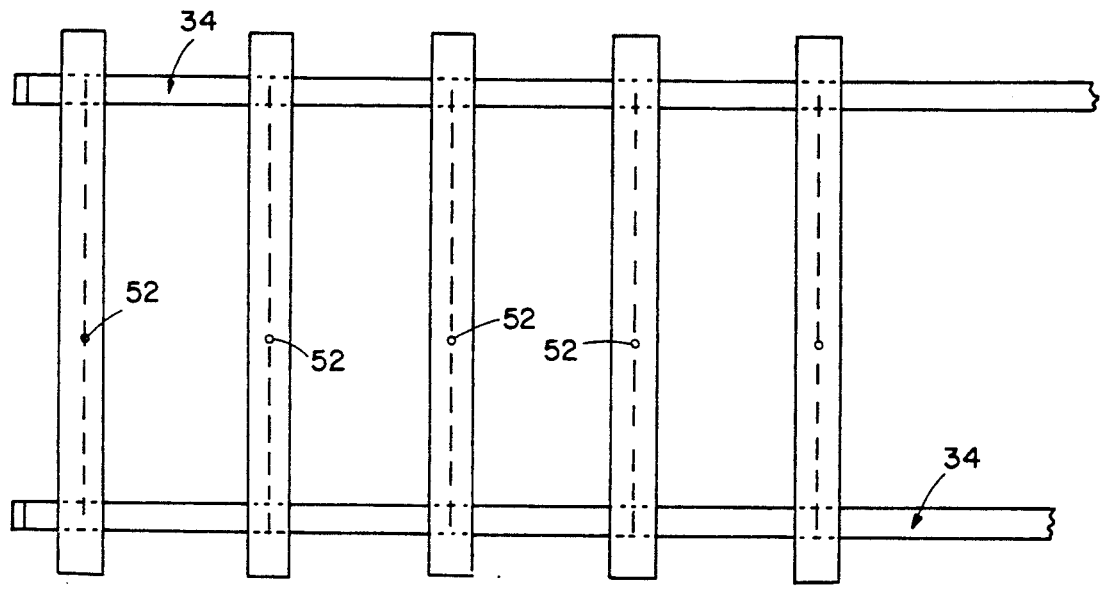
FIG. 5 is an elevational view of a blade arm.
Figure 7:
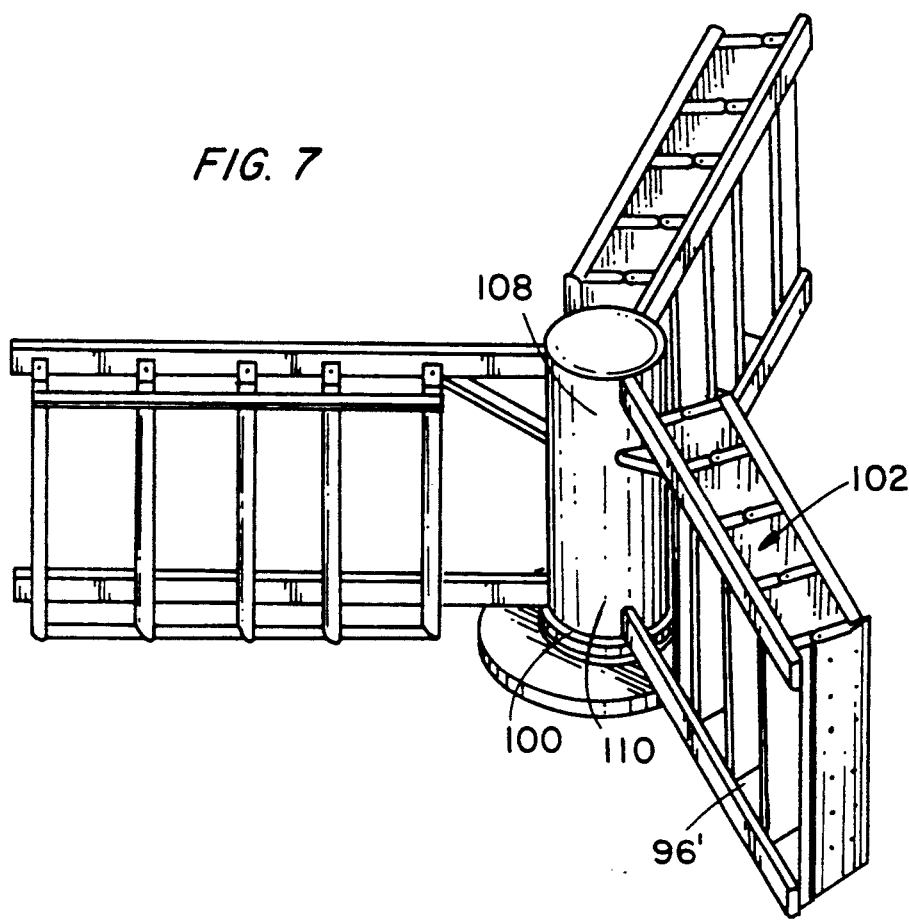
FIG. 7 is a perspective of an alternative form of the device in which air flow around the blades and the elements thereof is controlled.
Figure 9:
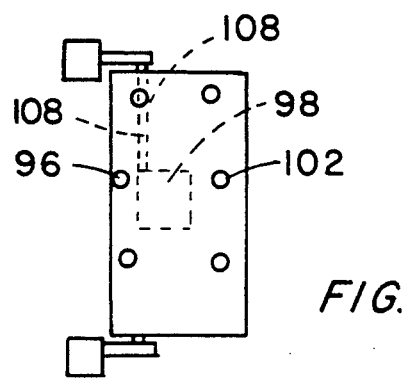
FIG. 9 is an elevational view of one airfoil-shaped blade with the flow control system therein.

Therefore, the device includes a means for holding the boundary layer onto the airfoil to prevent separation and thus reduce the effects of the wake 94. This means includes intake holes 96 defined in the top surface of each airfoil blade near the leading edge as indicated in FIG. 9 or intake holes 96' located near the location of maximum thickness 57 as indicated in FIG. 8. A pump means 98, such as an axial flow pump shown in FIG. 10, is located inside each airfoil blade and has its intake 97 fluidically connected to the intake holes 96 or 96' either individually or via a manifold 100. The pump means 98 has its exhaust end 101 fluidically connected to exhaust holes 102 defined through the airfoil top surface near the trailing edge thereof either individually or via a manifold 104. The pump is supported within each blade on the intake 97 and on the exhaust 101, and is driven from a main power supply 106 in the housing as shown in FIG. 7 via line conductors 108 located in the housing and extending through the struts, brackets and pivot pins and into the airfoil blade. The main power supply 106 is connected to a generator via line conductors 110 and is powered therefrom.

The details of the pump are commonly known from standard textbooks such as "Marks' Standard Handbook for Mechanical Engineers."

It is understood that while certain forms of the present invention have been illustrated and described herein, it is not to be limited to the specific forms or arrangements of parts described and shown.

I claim:

1. In a vertical axis windmill, a variable pitch propeller mechanism comprising:
   A) a hub having
      a hollow housing that includes a base, a closed top end, a cylindrical wall connecting said base and said closed end, and a longitudinal axis extending between said base and said closed end,
      bearing means on said base, and
      power generator means connected to said housing;
   B) three blade arms connected to said housing wall and extending radially outward from said housing wall, said blade arms being spaced apart from each other at equal angular spacings about said cylindrical wall, each blade arm including
      two support struts each being connected at a proximal end thereof to said housing wall and extending to a distal end that is spaced radially outward from said wall, said support struts being spaced apart from each other along said housing longitudinal axis,
      said support struts being parallel with each other,
      each strut having a longitudinal axis extending between said distal and proximal ends,
      a plurality of brackets mounted on each strut at locations that are spaced apart from each other along said strut longitudinal axis,
      a pivot pin mounted on each bracket,
      an airfoil-shaped blade mounted on each pivot pin, each airfoil-shaped blade including
         (a) a curved top surface,
         (b) a curved bottom surface,
         (c) two ends, (d) a longitudinal axis extending between said airfoil-shaped blade ends, said top and bottom surfaces being curved in the same direction relative to said airfoil-shaped blade longitudinal axis, (e) said top and bottom surfaces being curved around said airfoil-shaped blade longitudinal axis at different curvatures, with said top surface having a greater degree of curvature than said bottom surface, (f) said top and bottom surfaces intersecting each other and defining a leading edge adjacent to said brackets associated with said airfoil-shaped blade, and a trailing edge spaced from said leading edge, and (g) said mounting brackets all being connected to said airfoil-shaped blades adjacent to the leading edge of each airfoil-shaped blade, a first rigid connecting rod connected to one end of each of said airfoil-shaped blades near the trailing edge of each blade, a second rigid connecting rod connected to another end of each of said airfoil-shaped blades near the trailing edge of each blade, said rigid connecting rods connecting all of said airfoil-shaped blades together to move in unison, each blade arm further including a gusset strut connecting one support strut to said housing, said gusset strut being located adjacent to said one strut proximal end and being angled with respect to said one strut, said blade arms all being spaced apart from each other by angles of 120°;

boundary layer control means for controlling air flow along said airfoil-shaped blade top surfaces, said boundary layer control means including suction means for drawing air into said airfoil-shaped blades, said suction means including a pump located inside each airfoil-shaped blade, an intake hole defined in said airfoil-shaped blade near said leading edge, an exhaust hole defined in said airfoil-shaped blade near said trailing edge, and means fluidically connecting said pump means to said intake and exhaust holes, said pump being supported on said means fluidically connecting said pump means to said intake and exhaust holes.

2. The propeller mechanism defined in claim 1, wherein each airfoil-shaped blade includes a thickness dimension measured between said top and bottom surfaces, and includes a location of maximum thickness.

* * * * *